H. S. SAMUEL.

WEATHER SCREEN FOR MOTOR AND SIMILAR VEHICLES.

APPLICATION FILED SEPT. 12, 1912.

Reissued June 10, 1913.

13,574.

2 SHEETS—SHEET 1.

WITNESSES:

Nelson H. Copp

Frederick S. Chunt

INVENTOR.

Henri Saul Samuel

BY Russell B. Griffith his ATTORNEY.

H. S. SAMUEL.

WEATHER SCREEN FOR MOTOR AND SIMILAR VEHICLES.

APPLICATION FILED SEPT. 12, 1912.

Reissued June 10, 1913. 13,574.

2 SHEETS—SHEET 2.

*WITNESSES:*

Nelson H. Copp

Frederick S. Chmt

*INVENTOR.*

Henri Saul Samuel

*BY* Russell B. Griffith

*his ATTORNEY.*

UNITED STATES PATENT OFFICE.

HENRI SAUL SAMUEL, OF HADLOW, ENGLAND, ASSIGNOR, BY MESNE ASSIGNMENTS, TO THE STAHLBRODT COMPANY, OF ROCHESTER, NEW YORK, A CORPORATION OF NEW YORK.

WEATHER-SCREEN FOR MOTOR AND SIMILAR VEHICLES.

13,574. Specification of Reissued Letters Patent. Reissued June 10, 1913.

Original No. 879,195, dated February 18, 1908, Serial No. 292,781. Application for reissue filed September 12, 1912. Serial No. 720,100.

*To all whom it may concern:*

Be it known that I, HENRI SAUL SAMUEL, a subject of the King of Great Britain, and formerly residing at Perth, Scotland, but now residing at Hadlow, in the county of Kent, England, have invented a certain new and useful Wind-Shield or Weather-Screen for Motor and Similar Vehicles, of which the following is a specification.

This invention relates to wind or weather shields or screens for motor and similar vehicles and has for its chief object to provide a neat and efficient screen that can be readily adjusted or moved to suit requirements.

The shield or screen is made in two parts, one extending inwardly and upwardly from the dash or front part of the vehicle so as to protect at all times the driver's hands while grasping the steering wheel or handle independently of the position of the second part of the screen which is adjustable and serves as a substantially vertical shield for the face and the upper part of the body of the occupant of the driver's seat and also as a substantially horizontal table.

Figure 1:
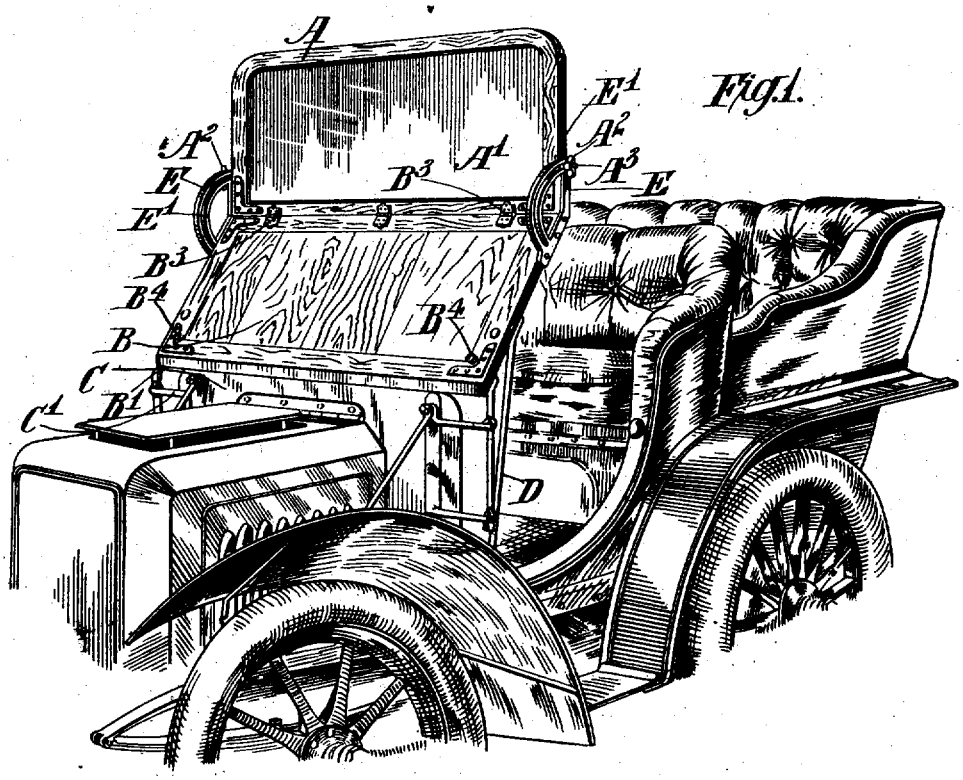
Figure 2:
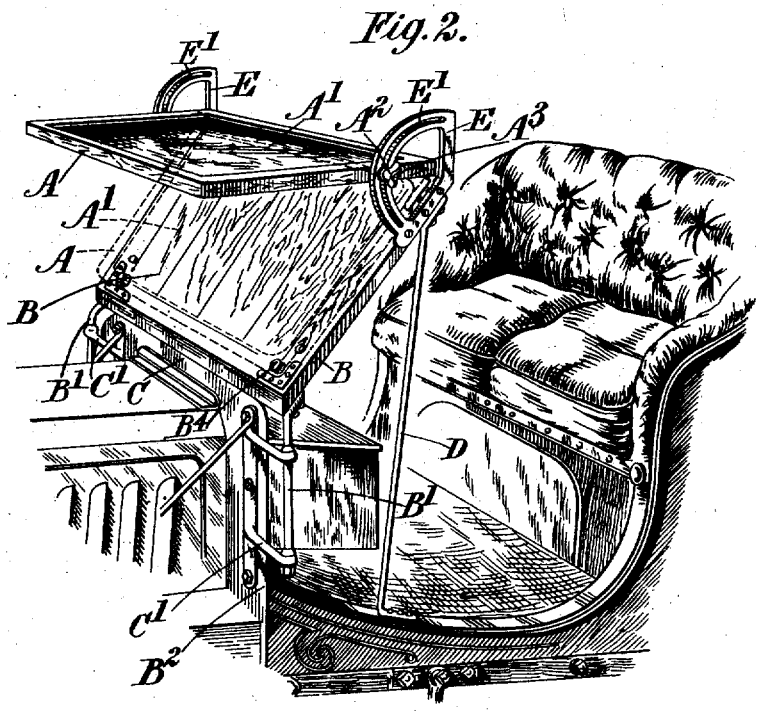

Referring to the drawings:—Figure 1 is a perspective view of one form of weather guard or screen for a motor car constructed in accordance with this invention, the screen being shown raised to its fullest extent, and Fig. 2 is a similar view of the screen with the upper part in an intermediate position in which it serves for a table or support.

A is the upper or transparent portion and B the lower portion of the screen. The upright part A has a window and is supported in such a manner that it can be raised or lowered bodily and preferably also so that it can be placed vertically, inclined at any convenient angle, or folded down in front horizontally so that it may serve as a table or support.

The upper part A is glazed or provided with a transparent material $A^1$ or it may have two or more glazed or transparent openings. This part is hinged or pivotally connected along its lower edge to the lower part B of the screen which extends inwardly and upwardly from the dash or front of the car, that is to say, it projects from the dash at or near to the level of or over the steering wheel and other manipulating gear in such a manner that while coming close to the steering wheel so as to protect or shield the hands of the driver it does not interfere with his movements in operating the steering wheel. At the same time this part of the guard shields the lower part of the body of the driver or other occupant of the front seat of the vehicle. The second or lower part of the guard extends inwardly and upwardly to a level near that of the steering wheel or handle and is so arranged that while affording the required protection for the driver's hands while on the steering wheel or handle and also for the lower part of the body it does not interfere with the manipulation or operation of the steering wheel or levers over which it projects.

The lower member B of the shield is preferably rigidly connected to the car or vehicle in any appropriate manner. In the example shown standards $B^1$ are attached to the lower part of the shield and these enter brackets $C^1$ on the dash C and are secured therein by nuts $B^2$ (see Fig. 2) on the threaded ends of the standards. Additional supports may be employed in connection with the lower part of the shield, such for example as the studs D which may be attached to the underside of the part B and to the floor or body of the vehicle. The lower member B instead of being immovably connected to the dash or to another part of the vehicle may be hinged or otherwise pivotally connected to the dash, in which case the struts D may be adjustably connected to the body of the car.

The upper part A of the screen when in the vertical position shown in Fig. 1 protects or shields the face of the driver while permitting him a clear view of the forward part of the vehicle and also of the road ahead. It comes sufficiently close to him to avoid drafts or strong air currents coming between it and him and is conveniently connected to the lower part by hinges $B^3$. The part A is also adjustable relatively to the lower part so that it can be raised or lowered at will.

A convenient form of adjustment by which the part A can be fixed in the required position is shown in the drawings and consists of slotted segments E $E^1$ connected to the lower part B and through the slots in which bolts $A^3$ on the upper part A of the shield project, clamping nuts $A^2$ being provided to lock the upper part to the segments at any desired point. When the part A of the shield is lowered into the horizontal position shown in full lines in Fig. 2, it may serve as a luncheon table or as a support for maps, guide books or other articles and in place of folding down outward it may be adapted to fold inward. When desired the part A may be lowered to lie against the part B as shown in dotted lines in Fig. 2, proper cushions $B^4$ being provided to prevent noise when the shield is in this position and any appropriate catches may be used to lock the two parts together when folded down.

It will be appreciated that when the parts are as shown in Fig. 1, the shield is carried as close to the occupants of the front seat as is possible without interfering with their freedom of movement or interrupting their view, but affording an efficient protection from wind or dust, and whether the part A is raised or lowered the hands of the driver which are constantly required upon the steering wheel are always hidden from the weather. On account of the manner in which the shield is constructed it does not afford such a resistance to the wind as it would if continued straight up from the dash and when the part A of the shield is not in use and is folded down the entire shield occupies very little space. The part B instead of being slatted as shown may also comprise a frame such as the part A glazed or provided with transparent material as above described. Either or both parts may be divided vertically each part being separately adjustable.

The shield has been described as consisting of two parts, but it is also within the scope of this invention to form the upright part of more than one piece so as to provide for the height of the screen being varied to a greater extent than can be obtained by the means above described and without moving the lower part of the shield. The lower member may also be made in two or more parts so that the entire car may be caused to occupy a minimum of space when not in use. The upright part may be divided vertically.

I claim as my invention:

1. A wind-guard for vehicles consisting of a lower rigid flat portion permanently and immovably secured to the vehicle at its front or lower edge and extending transversely thereof and inclined rearwardly in proximity to the steering wheel or handle, an upper flat portion extending upwardly from the rear or upper edge of the lower portion in front of the driver's face, and permanently hinged to pivot relatively to the lower portion through an angle of 90°, and means arranged laterally of both members at each end thereof for rigidly securing them in any one of a plurality of different relative positions of adjustment.

2. A wind-guard for vehicles consisting of a lower stationary and rigidly supported flat portion extending transversely of the vehicle and inclined rearwardly in proximity to the steering wheel or handle, an upper transparent flat portion adjustably and permanently hinged upon the lower portion and adapted to be folded forwardly against the latter into parallelism therewith, and means for maintaining the portions in one of their positions of relative adjustment, said means being arranged laterally so as to clear the parts when folded.

3. In a wind-shield for a motor or similar vehicle, the combination with the dash or front part of the vehicle, of a lower member fixed to the dash and extending inwardly and upwardly to a level near that of the steering wheel or handle, the rods D for maintaining the member in such fixed and rigid position arranged rearwardly of the member and connected thereto and to a rigid part of the vehicle, a second flat and rigid member having a permanent hinged connection with the lower member and extending vertically upward from the lower member in front of the driver's face and means arranged at the ends of the members for adjusting the upper member relatively to the lower member.

4. In a wind-shield for a motor or similar vehicle, the combination with the dash or front part of the vehicle of a lower fixed member extending inwardly and upwardly from the dash to a level near that of the steering wheel or handle, a flat upper movable member extending up in front of the driver's face hinged or pivoted to the lower member, a slotted quadrant fixed to one member, and a clamping device on the other member coöperating with the slotted quadrant for the purpose described.

5. In a wind shield for motor or similar vehicles, the combination with the dash, of a lower flat member rigidly fixed at its front or lower edge to the upper edge of the dash and extending at an inclination rearwardly and upwardly to a level near that of the steering wheel or handle, the rods D for maintaining the member in such fixed and rigid position arranged rearwardly of the member and connected thereto at its respective ends and to a rigid part of the vehicle, a second flat and rigid member having a permanent hinged connection with the lower member to turn relatively thereto on an axis substantially coincident with its lower edge and with the upper edge of the lower member said upper member normally extending upwardly from the lower member in front of the driver's face but being adapted to fold forwardly against the lower member, and means arranged at each end of the members for adjusting the upper member relatively to the lower member each comprising interlocking devices connected to the members respectively at points adjacent to their axis of relative movement.

6. In a wind shield for motor or similar vehicles, the combination with the dash or front part of the vehicle, of a lower member immovably fixed at its forward portion to the dash and extending inwardly and upwardly to a level near that of the steering wheel or handle, means arranged in rear of the dash and extending from the rearward portion of said member to a rigid part of the vehicle to maintain the member in such fixed and rigid position, a second flat member extending vertically upward from the lower member in front of the driver's face and means for adjusting the upper member relatively to the lower member embodying laterally arranged securing devices at one end of the upper member.

HENRI SAUL SAMUEL.

Witnesses:
HARRY B. BROMLEY,
L. G. EVES.

Copies of this patent may be obtained for five cents each, by addressing the "Commissioner of Patents, Washington, D. C."